US009199306B2

(12) United States Patent
Delsine

(10) Patent No.: US 9,199,306 B2
(45) Date of Patent: Dec. 1, 2015

(54) SUPPORT HEAD FOR HANDLING A LADLE SHROUD

(75) Inventor: Damien Delsine, Dour (BE)

(73) Assignee: Vesuvius Crucible Company, Wilmington, DE (US)

( * ) Notice: Subject to any disclaimer, the term of this patent is extended or adjusted under 35 U.S.C. 154(b) by 986 days.

(21) Appl. No.: 13/130,358

(22) PCT Filed: Nov. 19, 2009

(86) PCT No.: PCT/EP2009/008255
§ 371 (c)(1),
(2), (4) Date: Jun. 13, 2011

(87) PCT Pub. No.: WO2010/057646
PCT Pub. Date: May 27, 2010

(65) Prior Publication Data

US 2011/0227267 A1 Sep. 22, 2011

(30) Foreign Application Priority Data

Nov. 20, 2008 (EP) .................................... 08169501

(51) Int. Cl.

| | |
|---|---|
| ***B23Q 1/25*** | (2006.01) |
| ***B22D 41/56*** | (2006.01) |
| ***B22D 41/50*** | (2006.01) |
| *B25H 1/00* | (2006.01) |
| *B66F 7/22* | (2006.01) |

(52) U.S. Cl.
CPC ................ *B22D 41/56* (2013.01); *B22D 41/50* (2013.01); *B25H 1/0007* (2013.01); *B66F 7/22* (2013.01)

(58) Field of Classification Search
USPC ........................................................... 269/55
See application file for complete search history.

(56) References Cited

U.S. PATENT DOCUMENTS

| | | | | | |
|---|---|---|---|---|---|
| 307,178 | A * | 10/1884 | Carter | ............................. | 269/45 |
| 2,352,699 | A * | 7/1944 | Ennis | ............................. | 269/75 |
| 4,253,649 | A * | 3/1981 | Hewson | .......................... | 269/45 |
| 4,316,561 | A | 2/1982 | Grosko | | |
| 4,593,838 | A | 6/1986 | Oberbach et al. | | |
| 4,787,591 | A * | 11/1988 | Villacorta | .................. | 248/316.7 |
| 4,943,039 | A * | 7/1990 | Jackson | .......................... | 269/45 |
| 5,665,264 | A * | 9/1997 | Sato et al. | ..................... | 222/607 |
| 7,621,495 | B2 * | 11/2009 | Young | ........................ | 248/316.1 |
| 8,163,229 | B2 * | 4/2012 | Funato et al. | ................... | 266/44 |
| 2004/0145892 | A1 * | 7/2004 | Kellough | ...................... | 362/208 |
| 2006/0180727 | A1 * | 8/2006 | Young | ........................ | 248/316.1 |

(Continued)

FOREIGN PATENT DOCUMENTS

| | | | | |
|---|---|---|---|---|
| DE | 102007032596 | * | 2/2009 | ................ B25B 5/00 |
| DE | 102007032596 A1 | * | 2/2009 | ................ B25B 5/00 |
| DE | 102007042422 | * | 3/2009 | ............. B25B 11/00 |

(Continued)

*Primary Examiner* — Lee D Wilson
*Assistant Examiner* — Alvin Grant
(74) *Attorney, Agent, or Firm* — Thomas Clinton; Donald M. Satina

(57) ABSTRACT

A support head capable of supporting a ladle shroud for casting liquid metal comprises a canal along which the metal can pass, extending essentially along an axis, the support head being designed for a tube handling device. Such a head comprises control means for controlling the angular orientation of the shroud with respect to the head, about an axis corresponding to the axis of the canal. A ladle shroud having defined control means is capable of collaborating with the support head.

19 Claims, 2 Drawing Sheets

(56) References Cited

U.S. PATENT DOCUMENTS

| | | | | |
|---|---|---|---|---|
| 2011/0240246 | A1* | 10/2011 | Boisdequin | 164/76.1 |
| 2011/0248055 | A1* | 10/2011 | Collura | 222/590 |

FOREIGN PATENT DOCUMENTS

| | | | | | |
|---|---|---|---|---|---|
| DE | 102007042422 | A1 | * | 3/2009 | B25B 11/00 |
| EP | 1179377 | A1 | * | 2/2002 | B22D 41/52 |
| EP | 2412457 | A1 | * | 2/2012 | |
| GB | 2171348 | A | | 8/1986 | |
| JP | 5950959 | A | | 3/1984 | |
| JP | S5950959 | A | | 3/1984 | |
| JP | 7164117 | A | | 6/1995 | |
| JP | 9108825 | A | | 4/1997 | |
| JP | 09201657 | A | | 8/1997 | |
| JP | H09201657 | A | | 8/1997 | |
| KR | 20040021971 | A | | 3/2004 | |
| RU | 2181316 | C2 | * | 4/2002 | |
| WO | WO 9804371 | A1 | * | 2/1998 | |
| WO | WO 2007057061 | A1 | * | 5/2007 | |
| WO | WO 2010057639 | A1 | * | 5/2010 | B22D 41/50 |

* cited by examiner

SUPPORT HEAD FOR HANDLING A LADLE SHROUD

BACKGROUND OF THE INVENTION (1) Field of the Invention

The present invention relates to a casting insulation, notably to a device for introducing a ladle shroud into such an installation.

(2) Description of the Related Art

A ladle shroud is a tube comprising a canal extending along an axis, which axis is vertical when the tube is in the position of use, the canal allowing a liquid metal from a metallurgical container such as a ladle to pass as far as a tundish. When it is in its position of use, the tube comprises an upper end in contact with an upstream element of the installation, secured to the ladle, and a downstream end immersed in a tundish.

A ladle shroud handling device comprising a manipulator arm which is moved manually by an operator is known from the prior art, the arm at one end comprising a gripper that can be positioned around the tube and can grip the latter, the gripper grasping the tube in order to move it and introduce it into the casting installation. In the prior art, the tube is grasped by the manipulator arm so that it is positioned at an angular orientation that is completely random relative to this arm, unless the operator offers the tube up to the manipulator arm in a particular orientation.

Such a device allows the tube to be introduced into the casting installation satisfactorily. However, such a device is not optimal in terms of reducing the costs associated with casting.

BRIEF SUMMARY OF THE INVENTION

To do that, the subject of the invention is a support head capable of, and configured for, supporting a ladle shroud for casting liquid metal, comprising a canal along which the metal can pass, extending essentially along an axis, the support head being designed for a tube handling device and configured to communicate with a tube-handling device, and comprising control means for controlling the angular orientation of the shroud with respect to the head, about an axis corresponding to the axis of the canal.

Thus, the orientation of the shroud with respect to a handling device comprising the support head can be easily determined. As a result, as the device effects a similar movement each time it introduces the shroud into the casting installation, it is also possible to determine the orientation in which the shroud is introduced relative to the casting installation, notably relative to the upstream element of the installation. Using such a support head, it therefore becomes possible to orientate the shroud in the desired way with respect to the casting installation.

That is particularly advantageous because it allows the shroud to be equipped with apertures or outlet ducts which will therefore have a determined orientation and allow the flow to be oriented thus improving the casting efficiency.

Furthermore, when the shroud can be grasped in several orientations by the handling device comprising the support head, the latter allows the same shroud to be introduced into the casting installation in several orientations. That also makes it possible to distribute the wear on the internal wall of the shroud, because the stream flowing from the ladle is generally slightly orientated and some wall positions thus become worn more rapidly than the rest of the wall. Likewise, when the shroud is introduced into the casting installation by sliding, that makes it possible to even out the wear of the contact surface that slides against an upstream element of the installation, certain regions having a predetermined position relative to the upstream element of the installation becoming worn more rapidly than the remainder of the surface. The overall life of the shroud is therefore lengthened and one and the same shroud can be used a greater number of times without the risk of premature failure of the ladle shroud.

These various effects which are obtained by virtue of the orientation of the shroud in the support head make it possible to improve the cost-effectiveness of the casting process.

The invention also comprises one or more of the features from the following list:

- the head comprises two arms on which the control means are arranged,
- in particular, the head is configured so that the two arms give the head a single configuration or so that the arms thereof form the articulated arms of a gripper and are capable of giving, and are configured to give, the head a plurality of configurations. When the arms give the head a single configuration, they are not able to move relative to one another. In that case, the handling device is a simple handling device because the head is made as a single piece and because the movement means that move it are less complicated because there is no need to provide a movement to close the arms. When the arms form a gripper, they are able to grip the shroud, making it possible to avoid clearances between the control means of the head and the shroud when the shroud is being moved thus guaranteeing even more reliable movement of the shroud and introduction thereof into the installation;
- the control means also form retaining means for holding the shroud on the head. The shroud can therefore be held on the head without the use of a gripper which, because of the clamping of the shroud, could damage the shroud. This embodiment makes it possible to reduce the risk of the shroud becoming damaged while it is being moved and introduced into the installation;
- the control means comprise at least one notch configured to extend along the axis of the shroud when the shroud is attached to the head, the notch being capable of, and configured for, collaborating with a relief belonging to the shroud and having, along the direction corresponding to the axis of the shroud, a flared entrance end. Thus, collaboration between the head and the shroud is collaboration on the basis of the shape. Further, because of the flared entrance to the notch, which allows the shroud to be guided into the notch, it is easier to adjust the position of the relief of the shroud on the head. This is all the more advantageous when the support head is brought onto the shroud by an automated device that performs predetermined movements;
  - the support head comprises an abutment surface of a shape that is complementary to that of a return surface of the shroud, and arranged and configured to come into abutment against this return surface. When this surface is a combination with notches, these notches of the head block the degrees of freedom of the shroud in terms of rotation and in terms of translation along all axes but in vertical translation. The surface of the head, which notably consists of the upper surface, in abutment with the return surface of the shroud, blocks downwards vertical translation of the shroud, the force of gravity preventing upwards vertical translation. The shroud is therefore fully retained by the angular orientation control means and by the upper surface of the support head.

The invention has also for an object a device for handling a ladle shroud for casting liquid metal, the device comprising a support head according to the invention, and movement means for moving the head, as well as drive means for driving the movement means and, preferably, operating means for operating the drive means.

Thus, the shroud can be introduced into the casting installation automatically, thus avoiding the difficulties associated with an operator manipulating the arm and accidents due to human error. Further, the time taken to introduce the ladle shroud into the installation can be reduced.

The invention has also for an object a ladle shroud for casting liquid metal comprising a canal along which the metal can pass, extending essentially along an axis, characterized in that it comprises control means for controlling the angular orientation of the shroud with respect to a support head according to the invention, about an axis corresponding to the axis of the canal, these means being capable of, and configured for, collaborating with the complementary means belonging to the head.

The means belonging to the shroud may also comprise a relief extending essentially along the axis of the canal and having a cross section that is invariable relative to this direction, this relief being capable of collaborating with a notch belonging to the head as defined hereinabove.

The shroud may also comprise a return surface preferably facing towards a lower end of the shroud when the shroud is in a position of use, in which position the axis of the canal is vertical, this surface being capable of coming into abutment with an abutment surface of complementary shape belonging to the support head according to one embodiment of the invention.

Further, the control means belonging to the shroud may comprise at least three control elements. That notably may allow the shroud to be oriented in several orientations relative to the support head. Wear on the internal wall and on an upper surface of this shroud in contact with an upstream element of the installation can thus be better distributed, as explained above.

Another object of the invention is an assembly of a handling device according to the invention and of a ladle shroud according to the invention; the handling device and ladle shroud being in communication with each other.

A further object of the invention is a method of grasping a ladle shroud according to the invention comprising the following steps:

- a support head according to the invention is brought closer to a portion of the shroud situated below the level of the control means of the shroud when this shroud is in the position of use, so that the shroud is introduced into the space defined between the arms of the head,
- the head is moved upwards so that the angular orientation control means of the shroud collaborate with those of the head, preferably until the surface of the head is in abutment with the return surface of the shroud,
- optionally, when the arms of the head form the articulated arms of a gripper, these arms having been brought closer to the shroud with the gripper in the open configuration, the gripper is closed.

Another object of the invention is a method of installing a ladle shroud according to the invention in a casting installation using a handling device according to the invention, comprising the following steps:

- the steps of the grasping method according to the invention are carried out, and
- the support head is moved in order to introduce the shroud into the casting installation.

BRIEF DESCRIPTION OF THE SEVERAL VIEWS OF THE DRAWINGS

The invention will be better understood from reading the description which will follow, given solely by way of example and made with reference to the drawings in which.

DETAILED DESCRIPTION OF THE INVENTION

Figure 1:
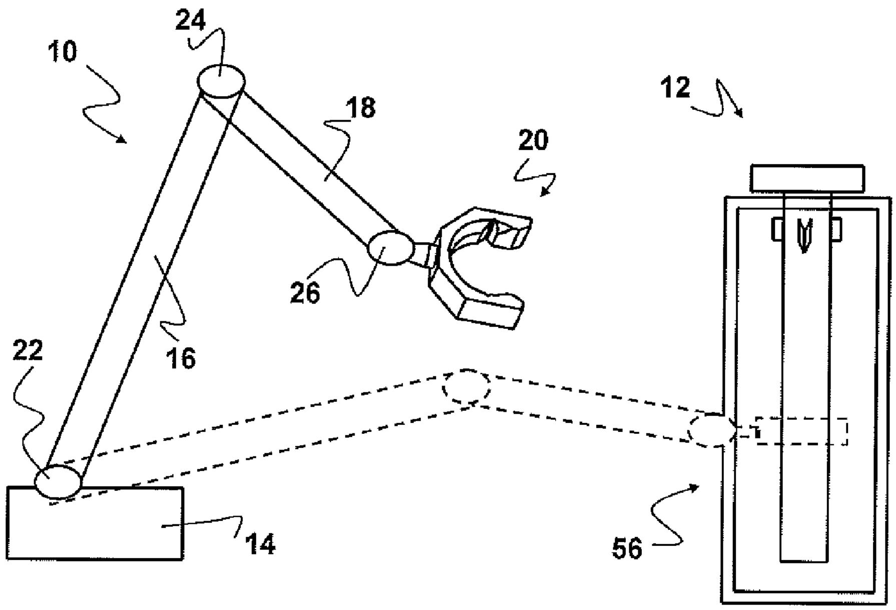
FIG. 1 is a schematic side view of an assembly of a handling device according to one embodiment of the invention and of a shroud according to one embodiment, stored in its position of use.

FIG. 1 depicts an assembly of a handling device 10 and of a ladle shroud 12 for casting liquid metal. The shroud 12 comprises a canal along which the metal can pass, extending essentially along an axis which is vertical when the shroud 12 is in the position of use, such a position being depicted in FIG. 1. The shroud is waiting in a storage device 56.

The handling device comprises a mount 14, a first movement arm 16 and a second movement arm 18 arranged at the end of the first arm 16. A support head 20 is installed on the device 10 at the end of the second movement arm 18.

The handling device 10 comprises connecting means 22, 24, 26 for respectively connecting the mount 14 to the first movement arm 16, for connecting the first movement arm 16 to the second movement arm 18, and for connecting the second movement arm 18 to the support head 20. The connecting means 22, 24, 26 consist of ball joints which allow each moving part (the first arm 16, the second arm 18 and the support head 20, respectively) to rotate about any axis with respect to the reference part (the mount 14, the first arm 16 and the second arm 18, respectively).

Thus, the two arms 16 and 18 and the connecting means 22, 24, 26 form movement means, or means of moving the support head 20. The device also comprises drive means for driving the movement means (not depicted in the figure), these drive means consisting for example of a motor, and operating means that command the movement means to allow an operator to command the movements of the arm 16 relative to the mount, of the arm 18 relative to the arm 16 and of the support head 20 relative to the arm 18. The arms 16, 18 and the support head 20 are operated in such a way that the support head remains always essentially horizontal.

Figure 2:
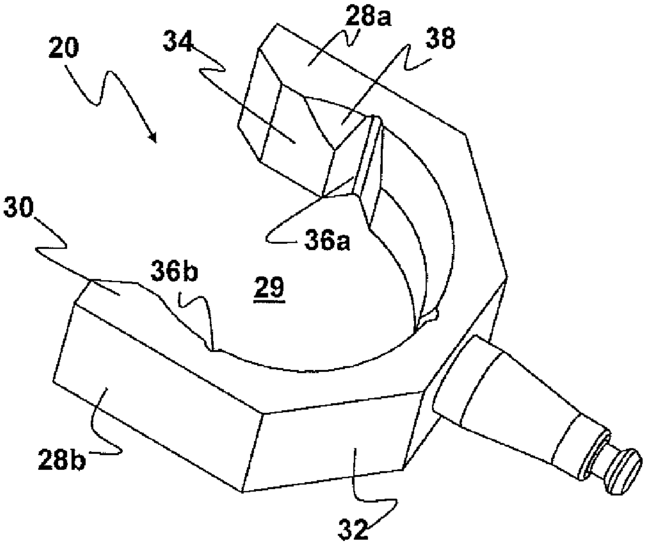
FIG. 2 is a perspective view of the support head of the handling device of FIG. 1.

The support head 20 is now going to be described in greater detail notably with reference to FIG. 2.

As may be seen from that figure, the support head is in the form of a fork and notably comprises two essentially parallel lateral arms 28*a*, 28*b*. The two arms 28*a*, 28*b* are not able to move relative to one another and are therefore capable of giving the head a single orientation. A space 29, sized to accept a ladle shroud, such as the shroud 12, is defined between these two arms 28*a*, 28*b*.

Each arm 28*a*, 28*b* has an essentially parallelepipedal cross section and notably comprises a horizontal upper surface 30 and vertical external 32 and internal 34 surfaces.

The support head 20 comprises two notches 36*a*, 36*b*, each notch being formed on the internal surface 34 of a distinct arm 28*a*, 28*b*. The notches extend essentially in a direction perpendicular to the axis along which the arms extend, notably a vertical direction when the support head 20 is in its position of use. The direction in which the notches 36*a*, 36*b* extend coincides with that of the axis of the canal when the shroud is in its position of use.

The notches 36*a*, 36*b* extend from the upper surface 30 as far as the lower surface of the support head 20. Each notch 36*a*, 36*b* has, in the vertical direction when the support head is in its position of use, a flared entrance end 38. This flared end 38 notably consists of two chamfers, formed at the upper end, in the vertical direction, of portions of the internal surface 32 delimiting the notches 36*a*, 36*b*.

The notches 36*a*, 36*b* form control means for controlling the angular orientation of the shroud 12 about an axis thereof that corresponds with the axis of the canal when the head and the shroud are in their position of use, these notches being capable of collaborating with the shroud in a way that will be described hereinafter.

Figure 3:
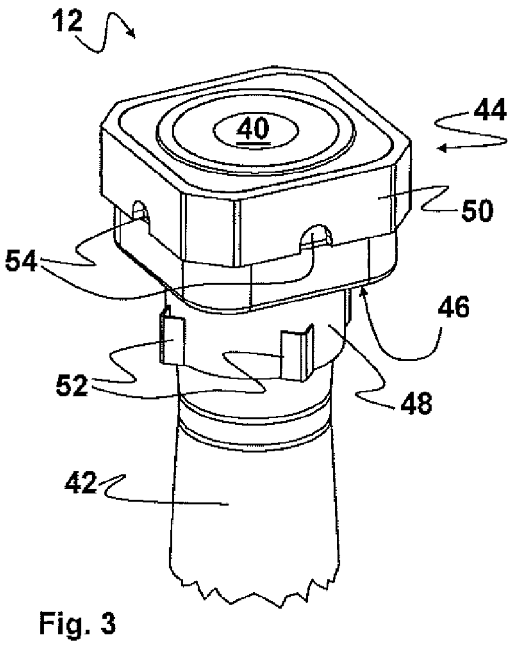
FIG. 3 is a perspective view of the shroud of FIG. 1, notably of an upper end thereof when the shroud is in its position of use.

The ladle shroud 12 will now be described essentially with reference to FIG. 3. FIG. 3 notably depicts an upper end of the shroud when this shroud is in its position of use.

The shroud 12 contains a canal 40 along which metal can pass, extending essentially along an axis, comprises a tube body 42 made of refractory material, and, at its upper end, comprises a head 14 of square cross section. The cross section of the head is of a shape that is distinct from a cross section of the tube body 42 which is of circular cross section. Further, the square cross section of the head 44 is larger in size than the circular cross section of the tube body 42 and as a result, between the head 44 and the tube body 42, the ladle shroud 12 comprises a return surface 46 which is essentially horizontal and faces towards the lower end of the shroud when the shroud is in its position of use. Such a return surface is intended to collaborate with an upper surface 30 of the support head 20 so as to come into abutment therewith when the shroud is in its position of use.

Further, as may be seen from FIG. 3, the shroud comprises a jacket 48 made as a single piece and placed around an end portion of the tube body. This jacket 48 is made of metallic material, notably of steel, and covers the entire head 44 and an upper part of the tubular part of the shroud.

The portion of the metallic jacket that covers the tubular portion of the shroud comprises four reliefs or fins 52. Each fin extends essentially along the axis of the canal, that is to say the axis that is vertical when the shroud is in the position of use, and has an invariable cross section, notably of triangular shape. The fins are identical, uniformly distributed about a circumference of the shroud, and are notably spaced 90° apart.

Two opposite fins 52 of the shroud 12 are able to collaborate with the notches 36*a*, 36*b* of the support head 20 and are of a shape that complements that of these notches. These fins therefore form means of controlling the orientation of the shroud with respect to the support head 20, the orientation being measured relative to the axis of the canal 40 of the shroud 12.

Because the shroud comprises four uniformly distributed fins 52, it can be positioned in the support head 20 in several orientations. Specifically, because the fins are identical, each fin 52 can with equal preference collaborate with either one of the notches 36*a*, 36*b*. That allows the shroud to be introduced into the installation in various orientations.

As may be seen from FIG. 3, the jacket is also configured to comprise an annular portion forming a belt 50 of greater thickness than the rest of the jacket. The belt 50 of the metallic jacket is formed in the portion in which this jacket covers the head 44. The thickness of the belt is greater than 10 millimeters, preferably 14 millimeters, whereas the rest of the jacket is of a thickness of between 2 and 7 millimeters, preferably between 4 and 6 millimeters.

The shroud also comprises notches 54 formed in the belt 50 of the jacket, notably in the lower part thereof. The notches 54 are each formed on one side of the head 44, in the middle of each side thereof. They are notably arranged above each fin 52. The notches 54 notably allow the head 44 of the shroud to be held in a storage device 56 which will be described briefly hereinafter. Because these notches are four in number and are distributed uniformly on the shroud, the shroud can also be placed in the storage device in various orientations.

The shroud 12 and the handling device 10 are not restricted to what has been described above.

Specifically, the support head 20 could consist not of a fork but of a gripper comprising two arms able to move relative to one another, capable of giving the support head 20 a plurality of configurations. Such a gripper notably makes it possible to minimize clearance between the shroud 12 and the support head 20, notably between the fins 52 and the notches 36*a*, 36*b*, once the shroud 12 has been installed in the support head 20.

Further, it is also conceivable for the upper surface of the head 20 not to collaborate with the return surface of the shroud. In that case, the notch 36*a*, 36*b* could for example have a bottom, at its end (considered in the vertical direction when the head is in its position of use) that is the opposite end to the entrance end. This bottom would allow the fins 52 to be held in the notches along the vertical axis when the head and the shroud are in their position of use.

In addition, the shape of the orientation control means of the shroud and/or of the support head could differ from those described, provided that these means collaborate.

The movement means for moving the handling device are not restricted to those described hereinabove either. They may comprise additional connections or fewer connections, additional movement arms or just one arm. Further, the various connections are not necessarily via ball joints, and in particular the connections 24 and 26 could be pivot connections. It is also conceivable for the arms 16 and 18 to be replaced by actuating cylinders so that their lengths can be lengthened.

Further, the shroud may be devoid of the notches 54. Retention on the storage device may be achieved in a different way from the way described and the shroud may, for example, simply be placed on the bottom of such a device. The shroud could also comprise a head of a cross section other than that described and/or could comprise no return surface, if the cross section of the shroud is constant over its entire dimension along the axis of the canal.

In addition, the part seized by the support head may also be a casting element comprising a shroud and a frame. In this case, the shroud could have no control means, these means being formed on the frame.

Figure 5:
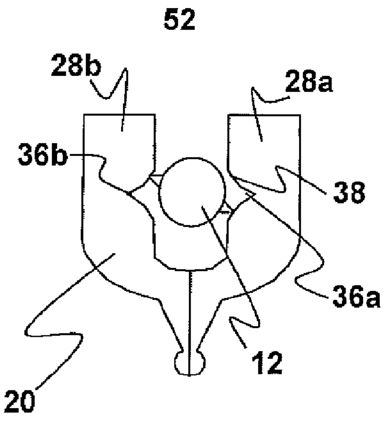
FIG. 5 is a view in section on a vertical plane of a shroud and of a support head according to FIG. 1, when the shroud and the support head are coming into a position of collaboration.

A method of grasping the shroud using the support head and moving the shroud into the casting installation will now be described using FIGS. 1, 4 and 5.

Figure 4:
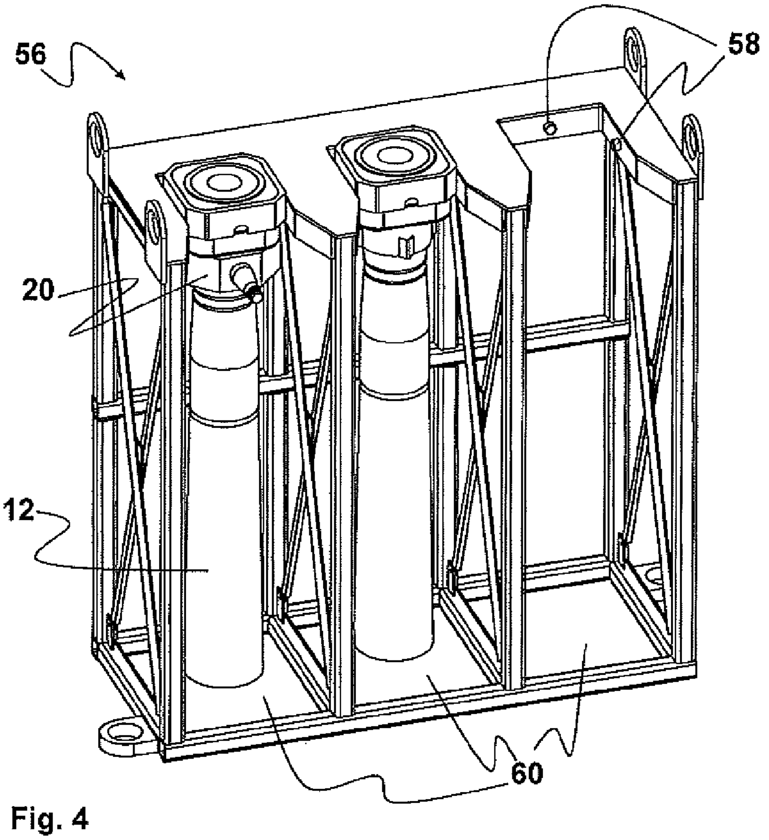
FIG. 4 is a perspective view of the device for storing shrouds comprising shrouds according to FIG. 3 and the support head of FIG. 2.

As can be seen from FIGS. 1 and 4, before the shroud is seized by the support head 20, it is placed in the storage device 56 in which it is suspended via pins 58 collaborating with at least two opposing notches 54 of the shroud. The shroud is thus suspended in the storage device 56 by an entrance end thereof and is stored in its position of use.

In order to seize the shroud in this position, the method comprises a first step during which the support head 20 is brought closer to a portion of the shroud that is situated below the level of the control means belonging to the shroud so as to introduce the shroud into the space 29 defined between the arms 28*a*, 28*b* of the head 20. In order for the handling device to be able to grip around the shroud, the storage device comprises an open side 60 which leaves access to a lateral face of the shroud 12 when this shroud is in its position of use. The position of the handling device after this step is depicted in dotted line in FIG. 1.

Because the portion of the shroud that is situated below the level of the control means belonging to the shroud is smaller in thickness than the portion of the shroud fitted with the jacket comprising these control means, as a result of the thickness of the jacket, the space between the arms 28*a*, 28*b* is dimensioned to accept this portion of the shroud.

Next, when the support head 20 is placed in the position depicted in dotted line in FIG. 1, this head is moved upwards so that the control means of the shroud collaborate with the means of the head, in this instance so that the fins 52, notably the two fins situated under the notches 54 via which the shroud is suspended, collaborate with the notches 36*a*, 36*b* of the shroud. To make it easier to fit the shroud into the support head 20, the fins 52 collaborate first of all with the flared entrance 38 of the support head, as may be seen in FIG. 5. Because of its configuration this entrance 38 guides the fin 52 towards the corresponding notch 36*a*, 36*b*, respectively.

Once this step has been completed, the fins 52 are housed in the notches 36*a*, 36*b*. The support head is moved upwards further until the upper surface 30 thereof begins to collaborate with the return surface 46 of the shroud. The support head is then placed on the shroud as has been depicted in FIG. 4.

The shroud 12 is now completely held in the support head 20. Specifically, the notches 36*a*, 36*b* prevent any rotation of the shroud and any translational movement thereof in the horizontal plane. Further, collaboration between the return surface 46 and the upper surface 30 of the support head 20 prevents the shroud 12 from effecting a downwards vertical translational movement. The only movement that the shroud might be able to effect is an upwards vertical translation, but that is blocked by the force of gravity when the shroud is in its position of use. Thus, the control means that control the angular orientation of the shroud also form retaining means that hold this shroud on the support head.

Thus, with the shroud held on the support head 20, the shroud 12 is moved upward still further until the notches 54 are free of the pins 58. The notches 54 are not configured to block the upwards movement of the shroud and this shroud can therefore be detached from the storage device 56. As the shroud is free relative to the storage device 56, this shroud can be moved using the arms 16 and 18 to bring it into the casting installation.

This relatively simple method makes it possible to control the orientation in which the shroud is brought into the casting installation and can also be fully automated.

It will be noted that the method is not restricted to that which has been described hereinabove. Numerous modifications and variations of the present invention are possible. For example, if the support head comprises a gripper, the method comprises an additional step of closing the gripper once the notches of the support head and the fins of the shroud are in place relative to one another and once the return surface of the shroud and the upper surface of the head have come into abutment. This step is performed before the shroud is detached from the storage device.

I claim:

1. Support head configured to support a ladle shroud for casting liquid metal, comprising a canal along which the metal can pass, extending essentially along an axis, the support head configured to communicate with a tube handling device, wherein the support head comprises control means for controlling an angular orientation of the shroud with respect to the head, about an axis corresponding to the axis of the canal, wherein the support head comprises an upper surface, wherein the control means comprise at least one notch having an interior surface and configured to extend in a direction perpendicular to the upper surface of the support head, and wherein the support head comprises a chamfer in communication with the upper surface of the support head and the interior surface of the notch.

2. Support head according to claim 1, further comprising two arms on which the control means are arranged.

3. Support head according to claim 2, configured so that the two arms give the head a single configuration.

4. Support head according to claim 2, wherein the arms comprise articulated arms of a gripper configured to give the head a plurality of configurations.

5. Support head according to claim 1, wherein the at least one notch comprises a plurality of notches, wherein each notch of the plurality of notches is formed on the internal surface of a distinct arm.

6. Support head according to claim 1, wherein the at least one notch comprises two notches, and wherein each notch of the two notches is formed on the internal surface of a distinct arm.

7. Handling device comprising a support head as defined in claim 1, and further comprising movement means for moving the head, and drive means for driving the movement means.

8. Ladle shroud for casting liquid metal comprising a canal along which the metal can pass, extending essentially along an axis, wherein the ladle shroud comprises a ladle shroud angular orientation controller; wherein the ladle shroud angular orientation controller controls the angular orientation of the shroud about an axis corresponding to the axis of the ladle shroud canal with respect to a support head according to claim 1, wherein the ladle shroud angular orientation controller is configured to collaborate with the support head angular orientation controller.

9. Shroud according to claim 8, wherein the ladle shroud angular orientation controller comprises a relief, wherein the relief is capable of collaborating with the support head notch of a head according to claim 1.

10. Shroud according to claim 8, further comprising a return surface configured to come into abutment with an abutment surface of complementary shape belonging to the support head according to claim 6.

11. Shroud according to claim 8, wherein the control means comprise at least three control elements.

12. Assembly of the handling device of claim 7 in communication with the ladle shroud of claim 8.

13. Method of grasping the ladle shroud of claim 8, comprising the following steps: bringing a support head of claim 2 closer to a portion of the shroud situated below the level of the control means of the shroud, so that the shroud is introduced into the space defined between the arms of the head; and moving the head upwards so that the ladle shroud angular orientation controller collaborates with the support head angular orientation controller.

14. Method of installing the ladle shroud of claim 8 in a casting installation using the handling device of claim 7, wherein the method comprises the following steps: carrying out the steps of the grasping method according to claim 13, and moving the support head in order to introduce the shroud into the casting installation.

15. Method of claim 14, wherein the ladle shroud has already been used in a first angular orientation with respect to the axis of the ladle shroud canal, and wherein, in the first step of the grasping method, the support head is brought closer to a portion of the shroud in such a way that the shroud is grasped with the shroud in an angular orientation about the axis of the ladle shroud canal which differs from the first orientation.

16. The support head of claim 5, wherein the control means comprise a flared entrance end.

17. The device of claim 7, further comprising operating means for operating the drive means.

18. The shroud of claim 8, further comprising a metal jacket on the shroud, wherein the ladle shroud angular orientation controller is formed on the metal jacket.

19. The method of claim 13, wherein the arms of the support head form the articulated arms of a gripper, and further comprising the step of closing the gripper.

* * * * *